United States Patent [19]
Duan et al.

[11] Patent Number: 5,703,158
[45] Date of Patent: Dec. 30, 1997

[54] AQUEOUS ANIONIC POLY (URETHANE/UREA) DISPERSIONS

[75] Inventors: Youlu Duan, Minneapolis; Michael J. Dochniak, St. Paul; Sonja Stammler, Marine On The St. Croix, all of Minn.

[73] Assignee: H.B. Fuller Licensing & Financing, Inc., Arden Hills, Minn.

[21] Appl. No.: 343,676

[22] Filed: Nov. 22, 1994

Related U.S. Application Data

[63] Continuation-in-part of Ser. No. 126,508, Sep. 24, 1993, abandoned, and a continuation-in-part of Ser. No. 304,653, Sep. 9, 1994, Pat. No. 5,608,000.

[51] Int. Cl.$^6$ .......................... C08L 75/06; C08G 18/46; C09D 175/06; C09J 175/06
[52] U.S. Cl. .................. 524/840; 156/331.1; 156/331.4; 156/331.7; 428/423.1; 428/423.4; 428/423.7; 428/424.2; 428/424.6; 428/424.8; 428/425.1; 428/425.8; 524/500; 524/507; 524/591; 525/123; 525/127; 525/440; 525/454; 525/455; 525/457; 525/528; 528/71; 528/906
[58] Field of Search .................... 524/500, 507, 524/591, 840; 525/123, 127, 440, 454, 455, 457, 528; 156/331.1, 331.4, 331.7; 428/423.1, 423.4, 423.7, 424.2, 424.6, 424.8, 425.1, 425.8; 528/71, 905

[56] References Cited

U.S. PATENT DOCUMENTS

| | | | |
|---|---|---|---|
| 3,169,949 | 2/1965 | Büning | 526/189 |
| 3,479,310 | 11/1969 | Dieterich et al. | 524/591 |
| 3,705,164 | 12/1972 | Honig et al. | 524/591 |
| 3,832,333 | 8/1974 | Chang et al. | 528/354 |
| 3,867,171 | 2/1975 | Ellsworth | 428/195 |
| 3,870,684 | 3/1975 | Witt et al. | 524/591 |
| 3,919,351 | 11/1975 | Chang et al. | 428/425 |
| 4,066,591 | 1/1978 | Scriven et al. | 428/425 |
| 4,092,286 | 5/1978 | Noll et al. | 156/331 |
| 4,098,743 | 7/1978 | Scriven et al. | 528/80 |
| 4,108,814 | 8/1978 | Reiff et al. | 528/71 |
| 4,110,284 | 8/1978 | Violland et al. | 528/76 |
| 4,147,679 | 4/1979 | Scriven et al. | 428/426 |
| 4,190,566 | 2/1980 | Noll et al. | 528/76 |
| 4,203,883 | 5/1980 | Hangauer, Jr. | 528/44 |
| 4,237,264 | 12/1980 | Noll et al. | 528/67 |
| 4,254,201 | 3/1981 | Sawai et al. | 430/111 |
| 4,277,380 | 7/1981 | Williams et al. | 528/71 |
| 4,303,774 | 12/1981 | Nachtkamp et al. | 528/71 |
| 4,307,219 | 12/1981 | Larson | 528/71 |
| 4,385,137 | 5/1983 | Lorenz et al. | 523/310 |
| 4,460,738 | 7/1984 | Frentzel et al. | 524/591 |
| 4,501,852 | 2/1985 | Markusch et al. | 524/591 |
| 4,540,633 | 9/1985 | Kucera et al. | 524/501 |
| 4,574,147 | 3/1986 | Meckel | 528/64 |
| 4,576,987 | 3/1986 | Crockatt et al. | 524/487 |
| 4,585,137 | 4/1986 | Lorenz et al. | 523/310 |
| 4,590,255 | 5/1986 | O'Connor et al. | 528/71 |
| 4,623,592 | 11/1986 | Daudé et al. | 428/423.3 |
| 4,636,546 | 1/1987 | Chao | 524/507 |
| 4,663,337 | 5/1987 | Das et al. | 514/382 |
| 4,711,935 | 12/1987 | Gmoser et al. | 525/452 |
| 4,762,880 | 8/1988 | Leung | 524/853 |
| 4,764,553 | 8/1988 | Mosbach et al. | 524/591 |
| 4,791,168 | 12/1988 | Salatin et al. | 524/601 |
| 4,801,644 | 1/1989 | Coogan | 524/839 |
| 4,851,459 | 7/1989 | Ramalingam | 523/414 |
| 4,870,129 | 9/1989 | Henning et al. | 524/840 |
| 4,876,308 | 10/1989 | Melby et al. | 524/780 |
| 4,883,694 | 11/1989 | Ramalingam | 428/35.2 |
| 4,895,894 | 1/1990 | Ruetman et al. | 524/840 |
| 4,921,842 | 5/1990 | Henning et al. | 524/839 |
| 4,923,756 | 5/1990 | Chung et al. | 428/423.7 |
| 4,927,961 | 5/1990 | Fock et al. | 524/591 |
| 4,954,389 | 9/1990 | Acharya et al. | 428/212 |
| 4,963,637 | 10/1990 | Barksby | 528/59 |
| 5,001,189 | 3/1991 | Fock et al. | 524/840 |
| 5,023,309 | 6/1991 | Kruse et al. | 528/49 |
| 5,039,732 | 8/1991 | Arora | 524/591 |
| 5,124,424 | 6/1992 | Endo et al. | 528/48 |
| 5,250,610 | 10/1993 | Hansel et al. | 524/591 |
| 5,331,039 | 7/1994 | Blum et al. | 524/840 |
| 5,334,690 | 8/1994 | Schafheutle et al. | 528/71 |
| 5,344,873 | 9/1994 | Blum | 524/591 |
| 5,432,228 | 7/1995 | Hilken et al. | 524/840 |
| 5,608,000 | 3/1997 | Duan et al. | 524/591 |
| 5,610,232 | 3/1997 | Duan et al. | 524/840 |
| 5,637,639 | 6/1997 | Duan et al. | 524/591 |

FOREIGN PATENT DOCUMENTS

| | | |
|---|---|---|
| 673432 | 4/1966 | Belgium . |
| 764009 | 7/1967 | Canada . |
| 928323 | 6/1973 | Canada . |
| 0 237 997 A1 | 3/1987 | European Pat. Off. . |
| 0 222 289 A3 | 5/1987 | European Pat. Off. . |
| 0 296 098 A2 | 6/1988 | European Pat. Off. . |
| 0 315 832 A1 | 10/1988 | European Pat. Off. . |

(List continued on next page.)

OTHER PUBLICATIONS

Product Brochure: Aqueous Polyurethane Dispersions From TMXDI® (META) Aliphatic Isocyanate, Feb. 1989.

NIAX® Performance Polyether Polyol PWB–1200 (From Union Carbide Corporation), 1989.

Product Brochure for Disperscoll KA–8464, Mobay Corporation, Jul., 1990.

Arendt, et al., "m–and p–TMXDI: Two New Isocyanates For The Polyurethane Industry," *Journal of Cellular Plastics*, Dec. 1982, pp. 376–383.

Ryan, et. al., "The Development of New Aqueous Polyurethane Dispersions for Coatings," Presented at the Water–Bourne, Higher Solids, and Powder Coatings Symposium Feb. 26–28, 1992 (14 pages).

Primary Examiner—Rabon Sergent
Attorney, Agent, or Firm—Vidas, Arrett & Steinkraus, P.A.

[57] ABSTRACT

Sulfonated polyester polyols and mixtures of sulfonated polyester polyols and hydroxy carboxylic acids are used to prepare improved aqueous anionic poly(urethane/urea) dispersions with a high crystallization rate, low heat activation temperature, high green strength, stability at low pH, which show good compatibility with other water based polymers and with crosslinkers. The aqueous anionic poly(urethane/urea) dispersions have high heat resistance after curing or blending with a crosslinker.

30 Claims, No Drawings

FOREIGN PATENT DOCUMENTS

| | | |
|---|---|---|
| 0 369 389 A1 | 11/1989 | European Pat. Off. . |
| 0 344 912 A3 | 12/1989 | European Pat. Off. . |
| 1443909 | 1/1965 | France . |
| 1200318 | 9/1965 | Germany . |
| 24 37 218 | 2/1976 | Germany . |
| 24 46 440 | 4/1976 | Germany . |
| 3903804 | 8/1990 | Germany . |
| 41 09 447 A1 | 1/1992 | Germany . |
| 40 24 567 A1 | 2/1992 | Germany . |
| 482 761 | 1/1970 | Switzerland . |
| 1128568 | 9/1968 | United Kingdom . |
| 91/15529 | 10/1991 | WIPO . |
| 92/02568 | 2/1992 | WIPO . |
| 92/16576 | 10/1992 | WIPO . |

AQUEOUS ANIONIC POLY (URETHANE/UREA) DISPERSIONS

CROSS-REFERENCE TO RELATED APPLICATION

This application is a continuation-in-part of application Ser. No. 08/126,508, filed Sep. 24, 1993, now abandoned, and a continuation-in-part of Ser. No. 08/304,653, filed Sep. 9, 1994, now U.S. Pat. No. 5,608,000, incorporated herein by reference.

BACKGROUND OF THE INVENTION

This invention relates to new aqueous poly(urethane/urea) dispersions having high crystallization rates, good stability at low pH and high heat resistance. These are important basic properties for improved poly(urethane/urea) dispersions, particularly for adhesive applications.

DESCRIPTION OF THE PRIOR ART

A. Sulfonated aqueous polyurethane dispersions

Wolfgang Keberle and Dieter Dieterich, Canadian Pat. 764,009 (Jul. 25, 1967) disclose aqueous polyurethane dispersions prepared from hydroxy-and carboxy-sulfonic acids, aminosulfonic acids, and the hydroxy, mercapto-and amino-carboxylic and sulfonic acids, polycarboxylic and polysulfonic acids include also the addition products (which may be saponified) of unsaturated acids and unsaturated nitriles, of cyclic dicarboxylic acid anhydrides, of sulfocarboxlic acid anhydrides, the addition products of reaction products of olefins with sulphur trioxide such as carbyl sulphate, of epoxypropane-sulfonic acid of sultones such 1,3-propanesultone, 1,4-butanesultone, 1,8-naphthosultone, of disulphonic acid anhydrides to aliphatic and aromatic mines.

Dieter Dieterich and Otto Bayer, U.S. Pat. No. 3,479,310 (Nov. 18, 1969) disclose aqueous polyurethane dispersions based on hydroxy-and carboxy-sulfonic acids, and aminosulfonic acids as described in Canadian Patent 764,009.

Hans Ludwig Honig, Gerhard Balle, Wolfgang Keberle, and Dieter Dieterich, U.S. Pat. No. 3,705,164 (Dec.5, 1972) disclose sulfonated aqueous polyurethane dispersions based on mixtures of ethylenediamine and 1,3-propane sultone.

Dieter Lesch and Wolfgang Keberle, Canadian Pat. 928323 (Jun. 12, 1973) disclose sulfonated aqueous polyurethane dispersions based on the sodium salt of N-(2-aminoethyl)-2-aminoethanesulfonic acid. The patent also relates to a process for preparation of the diamine sulfonate.

It was mentioned in this patent that Belgian Patent Specification No. 673,432 (March, 1966) to Keberle et al. discloses sulfonated aqueous polyurethane dispersions based on 2,4 diaminobenzene sulfonic acid. However, the polyurethane dispersions produced from these aromatic diaminosulfonic acids undergo discoloration on exposure to light. It was also mentioned that the process for the preparation of aliphatic diaminosulfonic acids whose salts are suitable for use as anionic structural components for light-fast polyurethane dispersions are already known, these known processes either entail considerable expenditure in apparatus or involve the use of physiologically very dangerous starting materials (reaction of sultone with amines).

Harro Witt and Dieter Dieterich, U.S. Pat. No. 3,870,684 (Mar. 11, 1975) disclose aqueous polyurethane dispersions based on an adduct of 1,3-propanesultone and ethylenediamine (sultone-diamine adducts are described in German Auslegeschrift No. 1,200,318). It also mentioned hydroxy-and carboxy-sulfonic acids, and aminosulfonic acids which described in Canadian Patent 764,009 may be used to prepare aqueous polyurethane dispersions.

Helmut Reiff, Wolfgang Wenzel, Jurgen Grammel, and Dieter Dieterich, U.S. Pat. No. 4,108,814 (Aug. 22, 1978), disclose aqueous polyurethane dispersions based on sulphonate diols have the general formula:

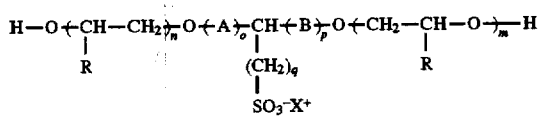

In the examples, the following sulfonated diol and diamine were used to prepare aqueous polyurethane dispersions: (1) Sodium salt of propoxylated 3-hydroxy-2-hydroxymethyl propane-sulfonic acid-1 (molecular weight 428) (AD); and (2) Sodium salt of ethylenediamino-2-ethanesulfonic acid (AAS).

Peter H. Markusch, James W. Rosthauser, and Michael C. Beatty, U.S. Pat. No. 4,501,852 (Feb.26, 1985), disclose aqueous polyurethane dispersions based on 70% solution in toluene of propoxylated sodium salt of 1,4-dihydroxy-2-butane sulfonic acid having a molecular weight of 430 ("sulfonate diol").

Otto Lorenz, Helmut Reiff, and Dieter Dieterich, Europaische Pat. 0 222 289 A3 (May 21, 1987), used sodium salt of 2-aminoethyl-2 aminoethanesulfonic acid (Na-AAS) and of dimethylsulfonate to prepare polyurethane dispersions.

Rudolf Hombach, and Helmut Reiff, U.S. Pat. No. 4,663,337 (May 5, 1987) used sodium salt of N-(aminoethyl)-aminoethane sulfonic acid to prepare polyurethane dispersions.

Wolfgang Henning, Rudolf Hombach, Waiter Mechel, and Manfred Dollhausen, U.S. Pat. No. 4,870,129 (Sep. 26, 1989), used sodium salt of N-(2-aminoethyl)-2-aminoethane sulfonate acid (AAS salt) to prepare polyurethane dispersions. The patent also states "Anionic or potentially anionic starting components include, for example, aliphatic diols containing sulphonate groups according to DE-OS No. 2,446,440 or DE OS No. 2,437,218, diols and/or diamino-sulfonates containing carboxylate groups or groups capable of being converted into carboxylate groups as described in CA-PS 928,323, e.g. the sodium salt of N-(2-aminoethyl)-2-aminoethane sulfonic acid".

Wolfgang Henning, Harald Petersen, and Gerhard Moormann, U.S. Pat. No. 4,921,842 (May 1, 1990) used a propoxylated adduct of but-2-ene-1,4-diol and NaHSO$_3$ (Mw 430: 70% in toluene) to prepare polyurethane dispersions. The patent states that "the anionic synthesis components include the aliphatic diols containing sulfonate groups according to DE-OS No. 2,446,440 (U.S. Pat. No. 4,108, 814) or DE-OS No. 2,437,218, diols and/or diamines containing sulfonate or carboxylate groups or sulfonic or carboxylic acid groups convertible into sulfonate or carboxylate groups of the type described in CA-PS No. 928,323, such as the sodium salt of N-(2-aminoethyl)-2-aminoethane sulfonic acid".

Sven H. Ruetman and Joginder N. Anand, U.S. Pat. No. 4,895,894 (Jan. 23, 1990), describe "Illustrative but non-limiting the compounds containing a potential anionic (ionic) group are . . . 1,7 dihydroxynaphthalenesulfonic acid-3 (sodium salt, potassium salt, triethylammonium salt), 1,8-dihydroxynaphthalenedisulfonic acid-2,4 (sodium salt, potassium salt, triethylammonium salt), 2,4 diaminotoluene-sulfonic acid-5 (sodium salt, potassium salt, triethylammonium salt), the sulfonate diols described in U.S. Pat. No. 4,108,814".

Jurgen Fock and Dietmar Schedlitzki, U.S. Patent No. 5,001,189 (Mar. 19, 1991), disclose an aqueous polyurethane dispersion based on a polyol component which is a polyoxyalkylene ether with an average molecular weight of 400 to 10,000 and having at least two terminal hydroxyl groups and at least one —SO$_3$X group. A sulfonated polyether polyol is disclosed.

B. Polyurethane Dispersions based on Diisocyanate Mixtures

Wolfgang Henning, Rudolf Hombach, Walter Meckel, and Manfred Dollhausen, U.S. Pat. No. 4,870,129 (Sep. 26, 1989), disclose polyurethane dispersions based on mixtures of hexamethylene diisocyanate with Q(NCO)$_2$ in which Q denotes a divalent aliphatic hydrocarbon group with 4–12 carbon atoms or a divalent cycloaliphatic hydrocarbon group with 6–15 carbon atoms.

Herbert Fisch and Lothar Maempel, DE 40 24 567 A1, disclose polyurethane dispersions based on mixtures of hexamethylene diisocyanate and toluene diisocyanate.

Hans Bauriedel, Wolfgang Klauck, and Gunther Henke, PCT/EP92/00560 (Nov. 26, 1992) (DE 40 24567 A1) and (DE 41 09 477 A1) (Sep. 24, 1992) disclose aqueous polyurethane dispersions based on mixture of tetramethylxylylene diisocyanate (TMXDI) with hexamethylene diisocyanate (HDI), isophorone diisocyanate (IPDI), 1,3-xylylene diisocyanate (XDI), 2,2,4-trimethyl,1,6-hexane diisocyanate (TMDI), toluene diisocyanate (TDI), 4,4'-diphenylmethane-diisocyanate (MDI) and dicyclohexylmethane 4,4-diisocyanate (H$_{12}$MDI).

C. Crystallization of Polyurethane Dispersions

Lani S. Kangas and Charles W. Stobbie IV, European Pat. 0 344 912 A3 (Dec. 6, 1989), disclose moisture curable and hot melt polyurethane based on crystalline or semicrystalline polyester diols having melting points between 30° C. and 80° C. The polyurethane composition exhibits improved crystallization rates and possesses high green strength.

Palitha K. Abeywardena and Pak T. Leung, WO 92/02568 (Feb. 20, 1992), disclose polyurethane dispersions based on a crystalline oligomeric or polymeric polyol.

Dispercoll KA-8464, an aqueous polyurethane dispersion product of Bayer Corporation and Miles (a Bayer USA, Inc. Company), based on HDI and IPDI has a high crystallization rate and stability at low pH levels, but has medium heat resistance. U-42, another Bayer aqueous polyurethane dispersion product has high heat resistance, but a low crystallization rate.

D. Sulfonated Anionic Polyurethane Dispersions

Helmet Reiff, Wolfgang Wenzel, Jargen G. Rammel and Dieter Dieterich, U.S. Pat. No. 4,108,814, disclose the use of sulfonate polyether diols to prepare polyurethane dispersions.

Wolfgang Henning, Rudolf Hanbach, Waiter Meckel and Manfred Dollhausen, U.S. Pat. No. 4,870,129, disclose the use of sulfonate diamine as a chain extender in preparing polyurethane dispersions.

SUMMARY OF THE INVENTION

This invention relates to an improved poly(urethane/urea) prepolymer and aqueous poly(urethane/urea) dispersions (PUDs) made therefrom, the dispersions having a high crystallization rate, good quality stability at low pH and high heat resistance. Further embodiments are disclosed having extremely low VOCs, making them particularly suited for laminating adhesives. Accordingly, the invention provides aqueous dispersions of an anionic poly(urethane/urea) polymer, the poly(urethane/urea) polymer comprising the reaction product in aqueous dispersion of an isocyanate terminated polyurethane prepolymer and at least one amine functional chain extender or chain terminator compound, wherein the isocyanate terminated polyurethane prepolymer comprises the reaction product of a polyisocyanate component comprising a diisocyanate, with a polyol component, the polyol component providing both carboxylate groups and sulfonate groups and comprises:

at least one sulfonated polyester; and at least one hydroxy carboxylic acid of the formula:

wherein R represents a straight or branched, hydrocarbon radical containing 1 to 12 carbon atoms, and x and y represent values from 1 to 3, provided, however, that when the value of x is 1, an equivalent amount of trifunctional isocyanate is employed in the polyisocyanate component and when x is 3, an equivalent amount of monofunctional isocyanate is employed whereby the resulting polyurethane prepolymer remains substantially non-crosslinked; and the carboxylate and sulfonate groups of said isocyanate prepolymer are neutralized with an alkali hydroxide or a tertiary amine prior to, or simultaneous with, said reaction of said prepolymer and said amine functional chain extender or terminator.

In a further embodiment the invention provides a stable aqueous dispersion of an anionic poly(urethane/urea) polymer, the poly(urethane/urea) polymer comprising the reaction product in aqueous dispersion of an isocyanate terminated polyurethane prepolymer and at least one amine functional chain extender or chain terminator compound, wherein the isocyanate terminated polyurethane prepolymer comprises the reaction product of a polyisocyanate component with a polyol component, the polyisocyanate component comprises at least 50% by weight 1,6-hexamethylenediisocyanate, the polyol component comprises at least one sulfonated polyester, and the polyurethane/urea polymer has a crystallization rate of at least 54%.

DETAILED DESCRIPTION OF THE INVENTION

Molecular weights referred to herein are number average molecular weights.

In preferred embodiments, the present invention provides aqueous anionic poly(urethane/urea) dispersions with high crystallization rates, low heat activation temperature and high green strength. These aqueous anionic poly(urethane/urea) dispersions are stable at low pH (e.g. 5–7). Also these aqueous poly(urethane/urea) dispersions exhibit a high degree of compatibility not only with other water-based polymers (e.g. vinyl acetate emulsion), but also with crosslinking agents (e.g. Bayer/Miles' Desmodur DA). These aqueous poly(urethane/urea) dispersions also have high heat resistance after curing or blending with a crosslinker.

The sulfonated polyester polyols used to form the isocyanate terminated polyurethane prepolymer may be any polyester polyol which incorporates sulfonate groups via sulfonate functional dicarboxylic acid residues and/or sulfonate functional diol residues. The sulfonate functional groups may be in acid or salt form. Suitable salt forms are alkali metal salts, or tertiary amine salts. Typically such sulfonate functional dicarboxylic acid residues and/or sulfonate functional diol residues are a minor portion of the diol and/diacid moieties of the polyester, preferably 1.0%–10.0% by weight of the polyester. The non-sulfonated diacids and diols used in forming the sulfonated polyesters may be aromatic or aliphatic. Examples of the non-sulfonated diacids include adipic, azelaic, succinic, suberic and phthalic acids. Examples of the non-sulfonated diols include ethylene glycol, condensates of ethylene glycols, butanediol, butenediol, propanediol, neopentylglycol, hexanediol, 1,4-cyclohexane dimethanol, 1,2-propylene glycol and 2-methyl-1,3 propanediol. Examples of the sulfonate diacids include sulfoisophthalic acid, 1,3-dihydroxybutane sulfonic acid and sulfosuccinic acid. Examples of the sulfonate diols include 1,4 dihydroxybutane sulfonic acid and succinaldehyde disodium bisulfite.

The sulfonated polyester polyols useful in the invention suitably have molecular weights in the range of about 500 to 10,000, preferably 1,000–4,000, and melting temperatures between about 10° C. and 100° C. Preferred sulfonated polyester polyols for high crystallization rate embodiments have melting points between 30° C. and 80° C., most preferred between 40° C. and 60° C. Preferred sulfonated polyester polyols for low VOC laminating adhesives embodiments have a melting temperature below 50° C., more preferably below room temperature. Especially preferred are sulfonated polyester polyols prepared by reacting sulfonate diacids or diols with non-sulfonated short chain diols and short chain diacids or derivatives of diacids.

Examples of useful sulfonate diacids and diols include sulfoisophthalic acid (and sodium salt), sulfossucinic acid (and sodium salts), 1,4-dihydroxybutane sulfonic acid (and sodium salt), bis(2-hydroxyethyl)-5-(sodiosulfo) isophthalate and succinaldehyde disodium bisulfite.

Examples of non-sulfonated diols useful in preparing the sulfonated polyester polyols utilized in the invention include ethylene glycol or condensates of ethylene glycol for instance diethylene glycol, butanediol, butenediol, propanediol, neopentylglycol, hexanediol, 1,4-cyclohexane dimethanol, 1,2-propylene glycol and 2-methyl-1,3-propanediol.

Examples of non-sulfonated diacids useful in preparing the sulfonated polyester polyols utilized in the invention include adipic, azelaic, succinic, suberic acids, and phthalic acid.

Suitable such sulfonated polyester polyols include polyester polyols based on 5-sulfoisophthalic acid monosodium salt, adipic acid and 1,6-hexanediol, and polyester polyols based on 5-isophthalic acid monosodium salt, adipic acid and diethylene glycol.

The polyol component utilized to make the poly(urethane/urea) dispersions of the invention may include, in addition to the sulfonated polyester polyol, a dihydroxy carboxylic acid, optionally also with a polyester polyol or a polyether polyol or a mixture of polyester and polyether polyols.

Carboxylate groups of the hydroxy alkanoic acid will offer additional water dispersibility for the resulting polyurethanes, in addition to sulfonate groups of the sulfonated polyester polyols. Carboxylate groups in the polyurethanes can also function as crosslinking points for reaction with polyfunctional aziridines. The hydroxy carboxylic acids used to form the isocyanate terminated polyurethane prepolymer are compounds of the formula:

wherein R represents a straight or branched, hydrocarbon radical containing 1 to 12 carbon atoms, and x and y represent values from 1 to 3, provided, however, that when the value of x is 1, an equivalent amount of trifunctional isocyanate is employed and conversely when x is 3, an equivalent amount of monofunctional isocyanate is employed so that the resulting polyurethane prepolymer remains substantially non-crosslinked. Preferably, x is 2, and, more preferably, the hydroxy carboxylic acids are α,α-dimethylol alkanoic acids represented by the formula:

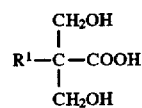

where $R^1$ denotes hydrogen or an alkyl group with up to a carbon atoms. Examples of such compounds are 2,2-dimethylolacetic acid, 2,2-dimethylolpropionic acid, 2,2-dimethylolbutyric acid and 2,2-dimethylolpentanic acid. The preferred dihydroxyalkanoic acid is 2,2-dimethylolpropionic acid (DMPA).

The polyol component used to prepare the isocyanate terminated prepolymer may also include a non-sulfonated polyester polyol or polyether polyol. Such polyols are generally less costly than the sulfonated polyester polyols but still may contribute to forming a polymer with good compatibility with aqueous acrylic polymer dispersions. In some embodiments, a low molecular weight diol may also be employed as part of the polyol component. The low molecular weight diols used in forming the isocyanate terminated polyurethane prepolymer are aliphatic diols, particularly alkylene diols. Their molecular weight range is from 60 to 400. Preferably, the low molecular weight diols are $C_2$–$C_8$ alkylene diols and most preferably $C_3$–$C_6$ alkylene diols examples of the low molecular weight diols are ethylene glycol, 1,3-propylene glycol, and more preferably, 1,4-butanediol (1,4-BD) and 1,6-hexanediol. Such low molecular weight diols can contribute to an increased crystallization rate, high green strength, water resistance and good heat resistance.

The diisocyanates which are used in forming the isocyanate terminated polyurethane prepolymer can be aliphatic or aromatic diisocyanates or their mixtures. Examples of suitable aliphatic diisocyanates are isophorone diisocyanate (IPDI), cyclopentylenediisocyanate, cyclohexylenediisocyanate, methylcyclohexylenediisocyanate, dicyclohexylmethanediisocyanate, hexamethylenediisocyanate (HDI), dicyclohexylmethanediisocyanate (H12MDI), and tetramethylxylenediisocyanate (TMXDI). Examples of suitable aromatic diisocyanates are phenylenediisocyanate, tolylenediisocyanate (TDI), xylylenediisocyanate, biphenylenediisocyanate, naphthylenediisocyanate and diphenylmethanediisocyanate (MDI).

The polyurethane prepolymer may be suitably formed in the presence of a water compatible solvent such as 1-methyl-2-pyrrolidone (NMP), dipropylene glycol methyl ether acetate (DPMA), or acetone. In the case where NMP or DPMA are used the amount of solvent used is suitably in the range of 3–15% of the final poly(urethane/urea) dispersion. In the case where acetone is used, after dispersing and chain extending of the prepolymer, the acetone is then distilled off so that the final level of acetone may be as little as 1.0% or even less without disrupting the stability of the dispersion.

After the prepolymer is formed, it is dispersed in water. To accomplish dispersion, the sulfonate groups, if not already in salt form, and at least a portion of the carboxylic acid groups of the prepolymer are neutralized with a tertiary amine. The tertiary amine may be added with the water, but more preferably neutralization is accomplished before the water is added, suitably by direct addition to the prepolymer/solvent mixture. As an alternative to the use of a tertiary amine, alkaline hydroxides, especially sodium hydroxide or potassium hydroxide, may be used to neutralize both the sulfonic and/or carboxylic acid groups.

For low VOC embodiments, it is most desirable that no solvent be used in the preparation of the isocyanate functional prepolymer, and further that no tertiary amine be used to neutralize the prepolymer. In such instances it has been found that neutralization with an alkaline hydroxide surprisingly allows the prepolymer to be dispersed even when very hydrophobic isocyanates, such as HDI, are used to prepare the isocyanate terminated prepolymer.

In the aqueous dispersion the isocyanate terminated prepolymer is chain extended and terminated by reaction with primary or secondary amine functional compounds. The final dispersed polymer is therefore a poly(urethane/urea). The chain extenders used are preferably water soluble compounds as these increase the dispersibility of the polymer end product in water. Organic diamines are preferably used because they generally provide the maximum increase in molecular weight without causing gelling of the poly (urethane/urea) dispersion. Useful chain extenders include aliphatic, cycloaliphatic, and aromatic diamines. Examples of suitable diamines are ethylenediamine (EDA), propylenediamine, 1,4-butylenediamine, piperazine, 1,4-cyclohexyldimethyldiamine, hexamethylenediamine (HDA), N-methylpropylenediamine, diaminophenylsulfone, diaminodiphenylether, diaminodiphenyldimethylmethane, 2,4-diamino-6-phenyltriazine, isophoronediamine, dimer fatty acid diamine, N-isodecycloxy propyl-1,3-diaminopropane and imidazolidinone functional diamines. Polyamine compounds having terminal primary amine groups as well as internal secondary amine groups, such as diethylene triamine (DETA) and triethylene tetraamine, may also be employed. Some crosslinking in the dispersed poly (urethane/urea) polymer may be provided through the secondary amine of such compounds, but such crosslinking can be kept low by appropriate stoichiometric adjustments.

Examples of useful chain terminators include aminoalcohols, like ethanolamine, propanolamine, butanolamine, N-methylethanolamine, N-methylisopropanolamine, taurine and isethionic acid.

The compositions of the invention may be crosslinked by adding a crosslinker to the dispersion at, or shortly before, the time it is applied to a substrate and dried. Crosslinking may be accomplished with conventional dispersable polyisocyanate crosslinkers. However these are not preferred as optimal crosslinking performance requires a relatively high level of terminal primary or secondary amine groups in the aqueous poly(urethane/urea) dispersions of the invention and therefore a correspondingly high level of diamine chain extender used in the chain extension/termination reaction. Generally, the more amine used, the more difficult it is to maintain a stable dispersion and reduce the pot-life of the dispersion after addition of the polyisocyanate crosslinker. Therefore, in a preferred embodiment of this invention, the carboxylate groups introduced into the sulfonated polyurethane polymer via the hydroxy carboxylic acid component of the polyol component are employed as crosslinking sites. The carboxylate groups are reacted with carboxylic acid reactive crosslinkers active at room temperature, such as polyfunctional aziridine compounds, zinc ammonium carbonate, zirconium carbonate or polyfunctional carbodiimide compounds.

HIGH CRYSTALLIZATION RATE POLY (URETHANE/UREA) DISPERSIONS

Poly(urethane/urea)s are generally comprised of a hard segment (isocyanate and chain extender) and a soft segment (polyol). European Pat. 0 344 912 A3 and WO 92/02568 disclose that the crystallization of polyurethane dispersions depends on the structure, composition and molecular weight of the polyol component. It would therefore seem from the prior art that the crystallization rate does not depend on the hard segment crystallization but on the soft segment crystallization.

Unexpectedly, it has been found in the compositions of the present invention that the crystallization rate of these poly(urethane/urea) dispersions depends on the structure of the diisocyanate (hard segment).

Such poly(urethane/urea) dispersions according to the invention include, in some embodiments, polyester polyol, for example Rucoflex 105–55 (a hexanediol adipate polyol, Eq. wt. 996, available from Ruco Polymer Corporation), dimethylol propionic acid (DMPA), hexamethylene diisocyanate (HDI), tetramethylxylylene diisocyanate (TMXDI), Triethylamine (TEA) if not in salt form, and ethylene diamine/ethanolamine (EDA/EA). Several such compositions, described in Table 2, below, were subjected to DSC testing for crystallization rate as follows: The samples were heated from –40 to 140 degrees C. at 10 degrees C./minute. The resulting thermographies are "first Run". The samples were then quench cooled and reheated at 10 degrees C./minute to produce the "Second Run" thermographies. The crystallization rates of such compositions are shown in Table 1.

TABLE 1

| Crystallization Rate and Ratio of HDI/TMXDI | | | |
|---|---|---|---|
| TMXDI/HDI (Molar) | DSC First Run Heat (Cal./G) | DSC Second Run Heat (Cal./G) | Cry. Rate* (%) |
| 1/0 | 12.6 | 0 | 0 |
| 0.8/0.2 | 17.4 | 0.4 | 2.3 |
| 0.5/0.5 | 10.79 | 6.15 | 57.0 |
| 0.4/0.6 | 15.9 | 9.95 | 62.6 |
| 0.33/0.66 | 11.4 | 8.4 | 73.7 |
| 0/1 | 10.5 | 8.5 | 80.1 |
| NP-4041** | 11.5 | 0 | 0 |
| KA-8464*** | 13.7 | 10.1 | 73.7 |
|  | 16.5 | 11.4 | 69.1 |

*Crystallization rate = DSC Second Run Heat/DSC First Run Heat.
**H. B. Fuller PUD based on TMXDI and butanediol adipate polyol and EDA/EA/DETA (diethylene triamine) chain extender.
***Bayer/Miles PUD based on HDI/IPDI and polyester polyol.

The crystallization rates of PUDs based only on TMXDI (e.g. NP-4041) and based only on HDI were 0 and 80%, respectively as seen in Table 1. The crystallization rate of KA-8464 as shown in Table 1 was about 70%, close to that of a PUD based on a 2/1 molar ratio of HDI/TMXDI, but KA-8464 is based on HDI/IPDI.

From this it can be seen that aqueous poly(urethane/urea) dispersions based on HDI and its mixtures with other diisocyanate may, according to the invention, be synthesized with varying crystallization rates, depending on the ratio of HDI to the other diisocyanate(s). The ratio may range from 100/0 to 0/100 by weight, preferably from 100/0 to about 50/50.

Bauriedel et al., PCT/EP92/00560 (Nov. 26, 1992) (DE 40 24567 A1), disclose aqueous polyurethane dispersions based on one isocyanate component consisting of at least 20% by weight TMXDI, and other diisocyanates (HDI, IPDI, XDI, TMDI, TDI, MDI and H₂MDI). TMXDI, at least 20% by weight in its mixture with other diisocyanate(s) is used to decrease the prepolymer viscosity made from the diisocyanate mixture, so a low solvent or even a solvent free process can be used to prepare the prepolymer of the patent.

In the present invention, however, TMXDI in its mixture with HDI is used to adjust the crystallization rate of the resulting polyurethane dispersions because the amount of TMXDI used was unexpectedly found to be inversely proportional to the crystallization rate of the resulting polyurethane dispersions. The use of smaller amounts of TMXDI down to zero produces a higher crystallization rate.

It was also unexpectedly found, according to the invention, that the crystallization rate of the poly(urethane/urea) dispersions of the invention also depends on the ratio of chain extender, e.g. ethylene diamine (EDA) to the chain terminator, e.g. ethanolamine (EA) used. The crystallization rate for several compositions are shown in Table 2.

TABLE 2

Crystallization Rate and Ratio of BDA/EA

| PUD Samples | #4133-7 | #4133-8 | #4133-9 |
|---|---|---|---|
| Rucoflex 105-55 (hexanediol adipate polyol Eq. Wt. 996) | 64.38 | 65.59 | 66.41 |
| DMPA | 4.35 | 4.39 | 4.45 |
| TEA | 6.22 | 6.29 | 6.37 |
| TMXDI | 8.54 | 8.64 | 8.75 |
| HDI | 11.44 | 11.57 | 11.71 |
| EA | 4.59 | 2.36 | 0.43 |
| EDA | 0 | 1.16 | 1.88 |
| Crystallization Rate (%) | 64.64 | 75.96 | 84.18 |

In Table 2, PUD samples #4133-7, #4133-8 and #4133-9 have nearly same contents of DMPA, TEA, TMXDI and HDI, but different ratio of EDA/EA in their compositions. These samples exhibited much different crystallization rates.

Therefore, the synthesis aqueous poly(urethane/urea) dispersions with high crystallization rate depends not only on ratio of HDI to other diisocyanate, but also on ratio of chain extender to chain terminator. The ratio may vary from a chain extender/chain terminator ratio of 100/0 to 0/100, preferably from about 50/50 to about 100/0 by weight.

HEAT ACTIVATION AND GREEN STRENGTH

In heat activation process, the poly(urethane/urea) dispersion adhesive is applied to the substrate and after complete evaporation of water the layer of adhesive applied is converted into an adhesive state by the action of heat. Good adhesives should exhibit low heat activation temperature and high green strength.

Generally, poly(urethane/urea) adhesives having a high crystallization rate should have low heat activation temperature and high green strength. U.S. Pat. No. 4,870,129 discloses that polyurethane dispersions based on HDI/IPDI exhibited low activating temperature and high heat resistance.

Unexpectedly, it has been found that poly(urethane/urea) dispersions of the invention based on mixtures of HDI with other diisocyanates do not always have low heat activating temperature and high heat resistance. Heat activation temperature and green strength not only depend on crystallization rate, but also depend on molecular weight of poly(urethane/urea). In this invention, it has been found that poly(urethane/urea) dispersions based on molar ratios* of HDI/TMXDI greater than 2/1 have high a crystallization rate, but have much different heat activating temperature and green strength. The results are shown in Table 3 for several compositions.

*In terms of wt, the molar ratio is:
HDI/TMXDI
2/1 (molar ratio) = (2/84)/(1/122) (weight ratio)
= 3/1 (weight ratio).

TABLE 3

Crystallization Rate and Heat Activation

| PUD Samples | #2 | #36 | #24 | #37 | #7 | #44 | #48 | #8 |
|---|---|---|---|---|---|---|---|---|
| Cry Rate (%) | 0 | 54 | 56 | 60 | 65 | 66 | 75 | 76 |
| Heat Activation (T-peel, Kg) | | | | | | | | |
| 125° F. | 1.3 | 0.3 | 0.3 | 0.4 | 0 | 0.4 | 5.9 | 0 |
| 150° F. | 3.5 | 0.2 | 0.3 | 0.4 | 0 | 3.3 | 7.7 | 0 |
| 175° F. | 4.8 | 0.4 | 0.4 | 2.2 | 0 | 9.3 | 11.8 | 0 |
| 200° F. | 6.2 | 0.3 | 0.4 | 5.3 | 0 | 10.5 | 11.9 | 0 |
| Film Brittleness* | 3 | 4 | 4 | 3 | 5 | 2 | 1 | 5 |

*Film brittleness: 1 ----------------> 5
                    Minor        Serious

TABLE 4

Compositions for samples in Table 3

| PUD Samples | HDI/TMXDI (Mol %) | EDA/EA (Mol %) | Cry. Rate (%) | Film Brittle |
|---|---|---|---|---|
| #2 | 0/100 | 50/50 | 0 | 3 |
| #36 | 67/33 | 50/50 | 54 | 4 |
| #24 | 67/33 | 50/50 | 56 | 4 |
| #37 | 67/33 | EA/Taurine | 60 | 3 |
| #7 | 67/33 | 0/100 | 65 | 5 |
| #44 | 83/17 | 100/0 | 66 | 2 |
| #48 | 83/17 | 80/20 | 75 | 1 |
| #8 | 67/33 | 50/50 | 76 | 5 |

In view of the results shown above, it can be seen that the present invention provides aqueous poly(urethane/urea) dispersions which have low heat activating temperature and high heat resistance based on HDI and its mixture with other diisocyanate (crystallization rate), and EDA and its mixtures with chain terminators (crystallization rate and molecular weight).

Surprisingly, it was found that carboxylated polyurethane prepolymers with high crystallization rate and low heat activation temperature based on HDI or HDI mixture with other diisocyanate, polyester polyol and DMPA cannot be dispersed into water. A large particle size dispersion with precipitation always occurs.

On the other hand, when sulfonated poly(urethane/urea) dispersions of the invention with high crystallization rate and low heat activation temperature were prepared (sulfonic acid is a stronger acid in comparison with carboxylic acid) the dispersions were found to have higher solubility in water in comparison with carboxylic acid based dispersions.

STABILITY AT LOW PH

Usually cationic and nonionic polyurethane dispersions have low pH (less than 7) stability, and anionic polyurethane dispersions are stable only at higher pH (greater than 7).

U.S. Pat. No. 4,870,129 discloses that sulfonated polyurethane dispersions can be stable at a pH of 5–7. A sodium salt of N-(-2 aminoethyl)-2-aminoethane sulfonic acid (AAS salt) was used as a chain extender to prepare the sulfonated polyurethane dispersions. However, an isocyanate functional polyurethane prepolymer containing sulfonate groups could not be prepared by this process. In addition, a large quantity of acetone was used to dilute the non-sulfonated prepolymer before adding the sulfonate diamine chain extender due to the high reactivity of the sulfonate diamine with diisocyanate.

U.S. Pat. No. 4,108,814 uses sulfonated polyether diols to prepare sulfonated polyurethane dispersions. These sulfonated diols were used to prepare prepolymers containing sulfonate groups, but these sulfonate diols contain ether bonds which should decrease the crystallization of the resulting polyurethane dispersions.

In the present invention, however, new sulfonated polyester polyols were used to synthesize sulfonated aqueous poly(urethane/urea) dispersions. Sulfonated polyester polyols were prepared from diacids, diols and sulfonate diacids and/or sulfonate diols. Aromatic and aliphatic sulfonate diacids and diols were used, and comprised 1–10% content of the resulting sulfonated polyester polyols.

Examples of commercially available sulfonated polyester polyols that are useful in the compositions of the invention are the "Rucoflex XS" series made by Ruco Polymer Corporation for H. B. Fuller. Rucoflex XS-5483-55 and Rucoflex XS-5536-60 are sulfonated polyester polyols based on 5-sulfoisophthalic acid monosodium salt (4 wt. % in XS-5483-55, and 6 wt. % in XS-5536-60), 1,6-hexanediol and adipic acid. See Table 5 below. 5-sulfoisophthalic acid monosodium salt is a cheaper key raw material for preparing aqueous sulfonated poly(urethane/urea) dispersions compared with the sodium salt of N-(2-aminoethyl)-2-aminoethane sulfonic acid as used in U.S. Pat. No. 4,870,129. It contains an aromatic ring which will increase the heat resistance of the final resulting sulfonated poly(urethane/urea) adhesives.

TABLE 5

Composition of Rucoflex XS-5484-55 and XS-5536-60

| Rucoflex | adipic acid and 1,6-hexane diol | 5-sulfoisophthalic acid monosodium salt |
|---|---|---|
| XS-5483-55 | 95% | 4% |
| XS-5536-60 | 94% | 6% |

In accordance with this embodiment of the invention, the sulfonated polyester polyol selected is typically reacted with HDI or a mixture of HDI with another diisocyanate at 70°–90° C. for 2–7 hours to prepare a prepolymer containing sulfonate groups. The prepolymer is dispersed into water and, finally, chain extended by EDA for example and/or chain terminators (e.g. EA).

Surprisingly, the reaction between the sulfonated polyester polyol and HDI (or mixture of HDI and other diisocyanate) has been found to be quite rapid. The reaction, carried out at 70°–80° C. just for 3–10 minutes, produced a semi-solid or even a solid, which was difficult to dissolve into acetone.

Therefore, an acetone process was used to prepare the sulfonate containing prepolymer. The sulfonated polyester polyol was dehydrated in a vacuum at 100° C. Acetone was added to dissolve it at 70°–80° C., and HDI and other diisocyanate (e.g. TMXDI) were then added. The reaction was carried at 80°–90° C. for 3–5 hours. After dispersing and chain extension, the acetone was then immediately distilled off. About half the amount of acetone used in U.S. Pat. No. 4,870,129 was used in this process.

The resulting sulfonated aqueous poly(urethane/urea) dispersions possess stability at a low pH (5–7), in addition to high crystallization rate and low heat activation temperature. They have good compatibility with other water-based polymers (e.g. vinyl acetate emulsion), and crosslinker (e.g. Bayer/Miles' Desmodur DA). The resulting adhesives exhibit high heat resistance.

EXAMPLES

The invention is further illustrated, but is not intended to be limited by the following examples in which all parts and percentages are by weight unless otherwise specified.

Determination of Crystallization Rate

DSC is used to measure the crystallization rate. The film samples made from aqueous poly(urethane/urea) dispersion are heated from −40° to 140° C. at 10° C./minute. The resulting thermographies are "first run". The samples are then quench cooled and reheated at 10° C./minute to produce the thermographies are "second run".

Crystallization rate=DSC second run melting heat/DSC first run melting heat. The results are shown in Table 4.

Heat Activation Testing

Drawdown poly(urethane/urea) dispersion on a 10 mil clear PVC (polyvinyl chloride film from Laird Plastics) with a #28 mylar rod. Dry to touch and cut into 1×6 inch strips. Seal the strips to uncoated 10 mil clear PVC using a Sentinel Heat Sealer at 50 psi nip pressure with a 30 second dwell time. Begin sealing at 125° F., increasing the temperature 25° F. increments to 200° F. Allow laminates to age 15 minutes and determine peel strength at 12 inches per minute on an Intelect 500. The results are shown in Table 6 below for the following Examples.

Example 1

229 g. Rucoflex XS-5483-55 (a sulfonated polyester polyol based on 5-sulfoisophthalic acid monosodium salt, adipic acid and 1,6-hexanediol, OH number 49.0) is dried in vacuo at 100° C. and then dissolved into 250 ml. acetone at 70°–80° C. 21 g. 1,6-hexane-diisocyanate (HDI) and 6.1 g. tetramethylxylylene diisocyanate (TMXDI) are added, whereupon the temperature is maintained at about 85° C. for 5 hours and then cooled to about 50° C. At this temperature, the prepolymer is dispersed by adding 389 g. water, and then chain extended by adding 2.4 g. ethylenediamine (EDA) and 1.22 g. ethanolamine (EA). The acetone is then immediately distilled off.

A finely divided dispersion having a solids content of 40.7%, viscosity of 115 cps, particle size of 226 nm and a pH of 11.2 is obtained.

Example 2

343.5 g. Rucoflex XS-5483-55 is dried in vacuo at 100° C. and then 250 ml acetone, 30.24 g. HDI and 0.18 g. T-12 (dibutyltin dilaurate) are added into it at 70°–80° C., whereupon the temperature is maintained at 80° C. for 2 hours. 10.98 g. TMXDI and 5.02 g. DMPA (dimethylolpropionic acid) is added, keep the temperature at 85° C. for another 3 hours. During the reacting, additional 300 ml acetone is added to control the viscosity of the reactant. The temperature is cooled to about 50° C., 600 g. water is added to disperse the prepolymer, 5 minutes later 2.25 g. EDA (in 30 g. acetone) is added. The acetone is then immediately distilled off.

A finely divided dispersion having a solids content of 39.3%, viscosity of 50 cps, and a pH of 6.41 is obtained.

Example 3

229 g. Rucoflex XS-5483-55 is dried in vacuo at 100° C. and then 0.09 g. T-12, 250 ml acetone and 21.0 g. HDI are added into it at 80° C. After maintaining at 80° C. for 2 hours, 6.1 g. TMXDI and 150 ml acetone are added, and keep the temperature at 85°-90° C. for another 3 hours. The temperature is cooled to about 50° C., 0.61 EA (ethanolamine) and 339 g. water first and then 2.7 g. EDA are added into the prepolymer acetone solution. The acetone is then immediately distilled off.

A finely divided dispersion having a solids content of 40.14%, viscosity of 420 cps and a pH of 11.5 is obtained.

Example 4

229 g. Rucoflex XS-5483-55 is dried in vacuo at 100° C. and then 0.09 g. T-12, 1.0 g. DMPA, 22.58 g. HDI and 250 ml acetone are added at 80° C. After maintaining at 80° C. for 2 hours, 6.56 g. TMXDI is added, and keep at 85°-90° C. for another 3 hours. The temperature is cooled to about 50° C., 393.5 g. water, 1.64 g. EA and 0.61 g. EDA (in 30 g. acetone) are added. The viscosity of the resulting dispersion is too high, additional 50 g. water is added. The acetone is then immediately distilled off.

A finely divided dispersion having a solids contents of 35.16%, viscosity of 95 cps, particle size of 154 nm and a pH of 7.6 is obtained.

Example 5

229 g. Rucoflex XS-5483-55 is dried in vacuo at 100° C., and then 1.34 g. DMPA, 0.09 g. T-12, 23.1 g. HDI, 2.69 g. TMXDI and 250 ml acetone are added at 85° C. After maintaining at 85° C. for 5 hours, the temperature is cooled to about 50° C., then 387 g. water, 0.7 g. EA and 1.62 g. EDA (in 50 g. water) are added into the prepolymer. The acetone is then immediately distilled off.

A freely divided dispersion having a solids contents of 35.5%, viscosity of 515 cps, and a pH of 8.09 is obtained.

Example 6

229 g. Rucoflex XS-5483-55 is dried in vacuo at 100° C. and then 1.34 g. DMPA, 23.1 g. HDI, 2.69 g. TMXDI, 0.09 g. T-12 and 250 ml acetone are added at 85° C. After maintaining at 85° C. for 5 hours, the temperature is cooled to about 50° C., then 386.98 g. water and 1.85 g. EDA are added into the prepolymer. The viscosity of the resulting dispersion is too high, additional 100 q. water is added. The acetone is then immediately distilled off.

A finely divided dispersion having a solids content of 36.32%, viscosity of 104 cps, particle size of 117 nm and a pH of 7.45 is obtained.

Example 7

229 g. Rucoflex XS-5483-55 is dried in vacuo at 100° C., and then 0.09 g. T-12, 21.0 g. HDI and 450 ml acetone are added at 80° C. After maintaining at 80° C. for 2 hours, 9.76 g. TMXDI is added, and the reaction is carried out at 85°-90° C. for another 3 hours. After the temperature is cooled to about 50° C., 397 g. water, 2.38 g. EA and 2.73 g. EDA (in 30 g. acetone and 20 g. water) are added into the prepolymer. The acetone is then immediately distilled off.

A finely divided dispersion having a solids content of 35.75%, viscosity of 300 cps, particle size 198 nm and a pH of 10.95 is obtained.

Example 8

114.5 g. Rucoflex XS-5483-55 and 50 g. Rucoflex S-102-55 (1–6 butanediol adipate polyester polyol, OH No. 55) and 6.7 g. DMPA are dried in vacuo at 100° C., then 17.64 g. HDI, 9.6 g. TEA (triethylamine) and 50 ml acetone are added at 75° C. After maintaining at 80° C. for 2 hours, 12.2 g. TMXDI is added, and the reaction is carried out at 85°-90° C. for another 3 hours. The temperature is cooled to about 50° C., 100 ml acetone is added, then 568.7 g. water and 1.8 g. EDA (in 35 ml acetone) are added into the prepolymer. After distilling acetone off, a finely divided dispersion is obtained.

Example 9

200 g. Rucoflex S-102-55 (Ruco's polyester polyol based on butanediol adipate, OH number 55.0) is dried in vacuo at 100° C., and then 20.1 g. DMPA, 34.8 g. HDI and 14.4 TEA are added at 70° C. After maintaining at 80° C. for 2 hours, 24.4 g. TMXDI is added, the reaction is carried out at 90°-100° C. for another 3 hours. The temperature is cooled to 70° C., 150 ml acetone is added, and then 6.25 g. taurine and 4.58 g. EA in 790 g. water are added into the prepolymer. After distilling acetone off, a finely divided dispersion is obtained.

Example 10

181 g. Rucoflex XS-5536-60 (a sulfonated polyester polyol based on 5-sufoisophthalic acid monosodium salt (6%), adipic acid and 1,6-hexanediol, OH number 61.9) is dried in vacuo at 100° C., and then 1.0 g. DMPA, 0.08 g. T-12, 22.58 b. HDI and 200 ml acetone are added at 80° C. After maintaining at 80° C. for 2 hours, 6.50 g. TMXDI is added, the reaction is carried out at 85°-90 ° C. for another 3 hours. After the temperature is cooled to about 50° C., 422 g. water with 1.68 g. EA and 1.61 g. EDA are added into the prepolymer. The acetone is then immediately distilled off.

A finely divided dispersion having a solids content of 26.10%, viscosity of 60 cps, particle size 41 nm and a pH of 7.63 is obtained.

TABLE 6

| Ex-ample | HDI/TMXDI (Mol %) | EDA/EA (Mol %) | Cry. Rate (%) | T-Peel (Kg) Activating at (°F.) | | | |
|---|---|---|---|---|---|---|---|
| | | | | 125 | 150 | 175 | 200 |
| 1 | 83/17 | 83/20 | 75.2 | 5.9 | 7.7 | 11.8 | 11.9 |
| 2 | 80/20 | 100/0 | 67.2 | 1.5 | 6.9 | 10.1 | 10.5 |
| 3 | 83/17 | 90/10 | 71.6 | 2.3 | 6.0 | 10.1 | 12.6 |
| 4 | 83/17 | 50/50 | 65.8 | 3.8 | 6.8 | 11.9 | 13.5 |
| 5 | 93/7 | 70/30 | 65.3 | 1.0 | 6.3 | — | 10.9 |
| 6 | 93/7 | 100/0 | 65.0 | 1.7 | 5.2 | 7.2 | — |
| 7 | 76/24 | 70/30 | 78.9 | 4.3 | 8.7 | 12.8 | 12.4 |
| 8 | 68/32 | 100/0 | 56.9 | 3.4 | 4.5 | 8.0 | 7.7 |
| 9 | 60/40 | Taurine/EA | 56.0 | 0.3 | 0.3 | 0.4 | 0.4 |
| 10 | 83/17 | 50/50 | 61.0 | 1.6 | 2.2 | 3.6 | 4.2 |

LOW VOC LAMINATING ADHESIVES

Using sulfonated polyester polyols which have melting points below 50° C., preferably ones which are liquid at room temperature, dispersions of the invention can be prepared without co-solvent. Further, neutralizing the resulting prepolymer with an alkali hydroxide eliminates VOCs produced by loss of tertiary amine during drying and adhesive bonding of the dispersion. Thus very low VOC adhesives may be prepared from compositions of the invention. Such adhesives have good clarity, are tacky, have low heat activation temperatures and bond well to a variety of substrates, making them especially suitable as laminating adhesives for thin film substrates.

Examples 11–19 illustrate the low VOC laminating adhesive embodiments of the invention. The following abbreviations are used in Examples 11–19:

| | |
|---|---|
| Rucoflex XS-5570-55 | A sulfonated polyester polyol based on 5-sulfoisophthalic acid monosodium salt, adipic acid and diethylene glycol, OH number 58.8 |
| Rucoflex S-1011-35 | Polyester polyol based on adipic acid and diethylene glycol, OH number 35.0 |
| Rucoflex S-1011-55 | Polyester polyol based on adipic acid and diethylene glycol, OH number 54.5 |
| 1,4-BD | 1,4-butanediol |
| MPdiol | 1-methyl-1,3-propanediol |
| DMPA | Dimethylolpropionic acid |
| TMXDI | Tetramethylxylyenediisocyanate |
| IPDI | Isophoronediisocyanate |
| HDI | Hexamethylenediisocyanate |
| T-12 | Dibutyltin dilaurate |
| NaOH | Sodium hydroxide |
| EA | Monoethanolamine |
| EDA | Ethylenediamine |
| DETA | Diethylenetriamine |
| WD-6314 | Polyisocyanate crosslinker (H. B. Fuller) |
| CX-100 | A 100% active polyfunctional aziridine crosslinker (ICI) |

Example 11

190.8 g of Rucoflex XS-5570-55, 102.9 g of Rucoflex S-1011-55 and 6.7 g of DMPA are reacted with 73.2 g of TMXDI in the presence of the T-12 at 85° C. for 4 hours to prepare a prepolymer. 3.4 g of sodium hydroxide and 1.83 g of EA are dissolved in 660 g of water, and then the prepolymer is dispersed by adding the aqueous solution containing NaOH and EA. After 5 minutes, a solution of 4.08 g of DETA in 51 g of water is added and stirring is continued for 15 minutes to form the aqueous poly(urethane/urea) dispersion. A finely divided dispersion having a solids content of 34.9% and a pH of 7.95 is obtained.

Example 12

190.8 g of Rucoflex XS-5570-55, 102.9 g of Rucoflex S-1011-55 and 6.7 g of DMPA are reacted with 48.8 g of TMXDI and 18.8 g of HDI at 80° C. for 3 hours to prepare a prepolymer. The prepolymer is then dispersed into a solution of 3.0 g of NaOH and 1.83 g of EA in 650 g of water. After 10 minutes, a solution of 4.08 g of DETA in 50.0 g of water is added to form an aqueous poly(urethane/urea) dispersion. A finely divided dispersion having a solids content of 35.1% and a pH of 7.05 is obtained.

Example 13

143.1 g of Rucoflex XS-5570-55, 154.5 g of Rucoflex S-1011-55 and 6.7 g of DMPA are reacted with 48.8 g of TMXDI and 18.8 g of HDI at 80° C. for 3 hours to prepare a prepolymer. The prepolymer is then dispersed in a solution of 3.0 g of NaOH and 1.83 g of EA in 650 g of water. After 5 minutes, a solution of 1.8 g of EDA and 2.04 g of DETA is added to form an aqueous poly(urethane/urea) dispersion. A finely divided dispersion having solids content of 35.2% and a pH of 7.1 is obtained.

Example 14

143.1 g of Rucoflex XS-5570-55, 154.4 g of Rucoflex S-1011-55, 9.0 g of MPdiol and 6.7 g of DMPA are reacted with 73.2 g of TMXDI and 25.2 d of HDI at 80° C. for 3 hours to prepare a prepolymer. The prepolymer is then dispersed in a solution of 3.0 NaOH and 2.75 g of EA in 736 g of water. After 5 minutes, a solution of 2.7 g of EDA and 3.06 g of DETA in 50.0 g of water is added to form a aqueous poly(urethane/urea) dispersion. A finely divided dispersion having solids content of 35.2% and a pH of 7.85 is obtained.

Example 15

143.1 g of Rucoflex XS-5570-55, 154 g of Rucoflex S-1011-55 and 6.7 g of DMPA are reacted with 44.4 g of IPDI and 16.8 g of HDI at 80° C. for 3 hours to prepare a prepolymer. The prepolymer is then dispersed in a solution of 2.5 g of NaOH and 1.83 g of EA in 600.0 g of water. After 5 minutes, a solution of 1.8 g of EDA and 2.04 g of DETA in 50.0 g of water is added to form a poly(urethane/urea) dispersion. A finely divided dispersion having solids content of 36.5% and a pH of 7.5 is obtained.

Example 16

95.4 g of Rucoflex XS-5570-55, 205.8 g of Rucoflex S-1011-55 and 6.7 g of DMPA are reacted with 44.4 g of IPDI and 16.8 g of HDI at 80° C. for 3 hours to prepare a prepolymer. The prepolymer is then dispersed in a solution of 2.8 g of NaOH and 1.83 g of EA in 515.0 g of water. After 10 minutes, a solution of 1.8 g of EDA and 2.04 g of DETA is added to form an aqueous poly(urethane/urea) dispersion. A finely divided dispersion having a solids content of 39.896 and a pH of 7.2 is obtained.

Example 17

286.2 g of Rucoflex XS-5570-55, 675.0 g of Rucoflex S-1011-35 and 20.1 g of DMPA are reacted with 116.6 g of IPDI and 44.1 g of HDI at 80° C. for 2.5 hours to prepare a prepolymer. The prepolymer is then dispersed in a solution of 8.4 g of NaOH and 4.8 g of EA in 2114 g of water. After 10 minutes, a solution of 4.7 g of EDA and 5.4 g of DETA in 150.0 g of water is added to form an aqueous poly(urethane/urea) dispersion. A finely divided dispersion having a solids content of 35.1% and a pH of 7.3 is obtained.

Example 18

286.2 g of Rucoflex XS-5570-55, 675.0 g of Rucoflex S-1011-35 and 20.1 g of DMPA are reacted with 132.3 g of HDI at 80° C. for 2 hours to prepare a prepolymer. The prepolymer is then dispersed in a solution of 8.4 g of NaOH and 4.8 g of EA in 1961.0 g of water. After 15 minutes, a solution of 4.7 g of EDA and 5.4 g of DETA in 150.0 g of water is added to form an aqueous poly(urethane/urea) dispersion. A finely divided dispersion having a solids content of 35.1% and a pH of 7.2 is obtained.

Example 19

(Example of practical application)

The dispersions of Examples 11–18 are coated on a polyester (PET) film (ICI 813 48 ga, Hostaphan 2600, 2 mid by a drawbar to give a coating weight of 1–1.5 lbs/3000 sq. ft. The coated film is air dried in a 120° F. oven for 4 minutes. The resulting tacky surface of the PET film is then bonded to a polypropylene (PP) film and compressed by a 4.5 lb Rubber Roller to give good contact. Then, the resulting laminate is heated at 180° F. for 5 second by a Sentinel Heat Sealer. The results of the bonding strengths are shown in Table 7.

TABLE 7

| | Bonding strength (180° peel, PET/PP, g/in) | | | | | |
|---|---|---|---|---|---|---|
| | PUD* | | PUD/CX-100 | | PUD/WD-6314 | |
| Example | 24 hrs | 7 days | 24 hrs | 7 days | 24 hrs | 7 days |
| 11 | 450 | 380 | 310 | 320 | SF** | SF |
| 12 | 440 | 380 | 400 | 360 | SF | SF |
| 13 | 390 | 400 | 380 | 430 | SF | SF |
| 14 | 490 | 420 | 420 | 470 | SF | SF |
| 15 | 350 | 380 | 410 | 490 | SF | SF |
| 16 | 380 | 900 | 390 | 1200 | 650 | 850 |

TABLE 7-continued

| | Bonding strength (180° peel, PET/PP, g/in) | | | | | |
|---|---|---|---|---|---|---|
| | PUD* | | PUD/CX-100 | | PUD/WD-6314 | |
| Example | 24 hrs | 7 days | 24 hrs | 7 days | 24 hrs | 7 days |
| 17 | 360 | 1000 | 370 | 1100 | 740 | 930 |
| 18 | 320 | 800 | 320 | 1100 | 790 | 970 |

*PUD: aqueous poly(urethane/urea) dispersion
**SF: substrate failure

While this invention may be embodied in many different forms, there are described in detail herein specific preferred embodiments of the invention. This description is an exemplification of the principles of the invention and is not intended to limit the invention to the particular embodiments illustrated.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. A stable aqueous dispersion of an anionic poly(urethane/urea) polymer, the poly(urethane/urea) polymer comprising the reaction product in aqueous dispersion of an isocyanate terminated polyurethane prepolymer and at least one amine functional chain extender or chain terminator compound, wherein the isocyanate terminated polyurethane prepolymer comprises the reaction product of a polyisocyanate component comprising a diisocyanate, with a polyol component, the polyol component providing both carboxylate groups and sulfonate groups and comprises:

at least one sulfonated polyester; and at least one hydroxy carboxylic acid of the formula:

$(HO)_x R(COOH)_y$ wherein R represents a straight or branched, hydrocarbon radical containing 1 to 12 carbon atoms, and x and y represent values from 1 to 3, provided, however, that when the value of x is 1, an amount of moles of trifunctional isocyanate equal to the number of moles of said hydroxy carboxylic acid in which x is 1 is employed in the polyisocyanate component and when x is 3, an amount of moles of monofunctional isocyanate equal to the number of moles of said hydroxy carboxylic acid in which x is 3 is employed; and the carboxylate and sulfonate groups of said isocyanate prepolymer are anionic, having counter-ions provided by neutralization with an alkali hydroxide or a tertiary amine prior to, or simultaneous with, said reaction of said prepolymer and said amine functional chain extender or terminator.

2. A dispersion as in claim 1 wherein the hydroxy carboxylic acid is an α,α-dimethylol alkanoic acid represented by the formula:

$$\begin{array}{c} CH_2OH \\ | \\ R^1-C-COOH \\ | \\ CH_2OH \end{array}$$

where $R^1$ denotes hydrogen or an alkyl group with up to a carbon atoms.

3. A dispersion as in claim 2 wherein the hydroxy carboxylic acid is selected from the group consisting of 2,2-dimethylolacetic acid, 2,2-dimethylolpropionic acid (DMPA), 2,2-dimethylolbutyric acid and 2,2-dimethylolpentanic acid.

4. A dispersion as in claim 3 wherein the hydroxy carboxylic acid is 2,2-dimethylolpropionic acid (DMPA).

5. A dispersion as in claim 1 wherein the polyisocyanate component comprises hexamethylene diisocyanate (HDI).

6. A dispersion as in claim 5 wherein the polyisocyanate comprises a mixture of HDI and a second diisocyanate.

7. A dispersion as in claim 6 wherein the second diisocyanate is a member of the group consisting of isophorone diisocyanate (IPDI), cyclopentylenediisocyanate, cyclohexylenediisocyanate, methylcyclohexylenediisocyanate, dicyclohexylmethanediisocyanate, dicyclohexylmethanediisocyanate (H12MDI), tetramethylxylenediisocyanate (TMXDI), phenylenediisocyanate, tolylenediisocyanate (TDI), xylylenediisocyanate, biphenylenediisocyanate, naphthylenediisocyanate and diphenylmethanediisocyanate (MDI).

8. A dispersion as in claim 1 wherein said sulfonated polyester polyol is a polyester of a sulfonated diacid or sulfonated diol, a non-sulfonated diacid and a non-sulfonated diol.

9. A dispersion as in claim 8 wherein said non-sulfonated diacid is selected from the group consisting of adipic, azelaic, succinic, suberic and phthalic acids, and mixtures thereof.

10. A dispersion as in claim 8 wherein the non-sulfonated diol is selected from the group consisting of ethylene glycol, diethylene glycol, butanediol, butenediol, propanediol, neopentyl glycol, hexanediol, 1,4-cyclohexane dimethanol, 1,2-propylene glycol and 2-methyl-1,3-propanediol.

11. A dispersion as in claim 8 wherein the sulfonated diacid or sulfonated diol is selected from the group consisting of sulfoisophthalic acid, sulfosuccinic acid, 1,4-dihydroxybutane sulfonic acid and succinaldehyde disodium bisulfite.

12. A dispersion as in claim 1 wherein the sulfonated polyester polyol has a molecular weight in the range of about 500 to 10,000 and a melting temperature in the range of about 10° to 100° C.

13. A dispersion as in claim 12 wherein said molecular weight range is about 1,000 to 4,000.

14. A dispersion as in claim 12 wherein the sulfonated polyester polyol has a melting temperature in the range of 40° C. to 60° C.

15. A dispersion as in claim 14 wherein the sulfonated polyester polyol is a polyester of 5-sulfoisophthalic acid monosodium salt, 1,6-hexanediol and adipic acid.

16. A dispersion as in claim 1 wherein said amine functional chain extender is a diamine.

17. A dispersion as in claim 1 wherein said amine functional chain extender is a member of the group consisting of ethylenediamine, propylenediamine, 1,4-butylenediamine, piperazine, 1,4-cyclohexyldimethyldiamine, hexamethylenediamine, N-methylpropylenediamine, diaminophenylsulfone, diaminodiphenylether, diaminodiphenyldimethylmethane, 2,4-diamino-6-phenyltriazine, isophoronediamine, dimer fatty acid diamine, N-isodecycloxy propyl-1,3-diaminopropane, imidazolidinone functional diamines, diethylene triamine, triethylene tetraamine, and mixtures thereof.

18. A dispersion as in claim 1 wherein the sulfonated polyester polyol has a melting temperature of less than 50° C.

19. A dispersion as in claim 18 wherein the sulfonated polyester polyol is a polyester of 5-sulfoisophthalic acid monosodium salt, diethylene glycol and adipic acid.

20. A dispersion as in claim 18 wherein the sulfonated polyester polyol is a liquid at room temperature.

21. A dispersion as in claim 18 wherein said sulfonate and carboxylate groups have been neutralized with an alkali hydroxide.

22. A dispersion as in claim 21 prepared without an organic co-solvent.

23. A method of producing a laminated film from a pair of sheet substrates, the method comprising applying an aqueous adhesive comprising a dispersion as in claim 21 to one of said substrates, drying the adhesive, applying the second of said substrates and activating the adhesive with heat.

24. A method as in claim 23 wherein said dispersion is prepared without an organic co-solvent.

25. A laminate prepared by the method of claim 23.

26. A dispersion as in claim 1 wherein said isocyanate terminated prepolymer is reacted with a mixture of at least one amine functional chain extender compound and at least one chain terminator compound.

27. A dispersion as in claim 26 wherein the chain extender is present in said mixture of chain extender and chain terminator in an mount of at least 50% by weight of said mixture of chain extender and chain terminator.

28. A dispersion as in claim 26 wherein said chain extender is a member of the group consisting of ethylene diamine, diethylene triamine, and mixtures thereof and said chain terminator is ethanolamine.

29. A dispersion as in claim 1 wherein said chain terminator is a member of the group consisting of ethanolamine, propanolamine, butanolamine, N-methylethanolamine, N-methyl-isopropanolamine, taurine and isethionic acid.

30. A stable aqueous dispersion of an anionic polyurethane polymer, the polyurethane polymer comprising the reaction product in aqueous dispersion of an isocyanate terminated polyurethane prepolymer and at least one amine functional chain extender compound, wherein the isocyanate terminated polyurethane prepolymer comprises the reaction product of a polyisocyanate component comprising at least 50% by weight 1,6-hexamethylenediisocyanate, with a polyol component, the polyol component providing both carboxylate groups and sulfonate groups and comprising:

at least one sulfonated polyester; and at least one dihydroxy carboxylic acid;

the carboxylate and sulfonate groups of said isocyanate prepolymer are anionic, having counter-ions provided by neutralization with an alkali hydroxide or a tertiary amine prior to, or simultaneous with, said reaction of said prepolymer and said amine functional chain extender; and the polyurethane polymer when dried has a crystallization rate of at least 54%.

* * * * *